US012804538B2

(12) United States Patent
Al-Mufti et al.

(10) Patent No.: US 12,804,538 B2
(45) Date of Patent: Nov. 17, 2026

(54) NON-REAL TIME RIC POWER LOSS DETERMINATION AND COORDINATION

(71) Applicant: Boost SubscriberCo L.L.C., Englewood, CO (US)

(72) Inventors: Khalid Al-Mufti, Sterling, VA (US); Gurpreet Sohi, Parker, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 296 days.

(21) Appl. No.: 18/767,429

(22) Filed: Jul. 9, 2024

(65) Prior Publication Data

US 2025/0358730 A1 Nov. 20, 2025

Related U.S. Application Data

(60) Provisional application No. 63/648,003, filed on May 15, 2024, provisional application No. 63/647,996, filed on May 15, 2024.

(51) Int. Cl.

| | |
|---|---|
| ***H04W 52/02*** | (2009.01) |
| ***H02J 13/12*** | (2026.01) |
| ***H04W 24/04*** | (2009.01) |

(52) U.S. Cl.

CPC ......... *H04W 52/0203* (2013.01); *H02J 13/12* (2026.01); *H04W 24/04* (2013.01)

(58) Field of Classification Search

CPC ......... H04W 36/0058; H04W 36/0085; H04W 36/302; H04W 60/04; H04W 52/0203; H04W 52/0206

See application file for complete search history.

(56) References Cited

U.S. PATENT DOCUMENTS

| | | | |
|---|---|---|---|
| 8,930,729 | B1 | 1/2015 | Fifield |
| 2018/0131531 | A1 | 5/2018 | Spiel |

OTHER PUBLICATIONS

Khalid Al-Mufti, Dynamic Non-Real Time RIC Power Consumption Allocation, U.S. Appl. No. 18/767,287, filed Jul. 9, 2024, pp. 1-49.

International Search Report and Written Opinion, PCT/US2025/029006, dated Sep. 24, 2025.

*Primary Examiner* — Anez C Ebrahim

(74) *Attorney, Agent, or Firm* — Kilpatrick Townsend & Stockton LLP

(57) ABSTRACT

An apparatus comprises a memory and a processor communicatively coupled to one another. The processor is configured to obtain a first power value associated with a local power source configured to provide power to a network component in a communication site. Further, the processor is configured to obtain a second power value associated with the network component and determine a power loss value associated with one or more connection interfaces based on the first power value and the second power value. The processor is configured to determine whether the power loss value is within a predefined value range, generate one or more possible modifications to one or more of the configuration commands in response to determining that the power loss value is within the predefined value range, generate a report comprising the power loss value and the one or more possible modifications, and associate the report with the communication site.

20 Claims, 5 Drawing Sheets

NON-REAL TIME RIC POWER LOSS DETERMINATION AND COORDINATION

RELATED APPLICATIONS

This application claims priority to U.S. Patent Application No. 63/647,996, filed on May 15, 2024, and U.S. Patent Application No. 63/648,003, filed on May 15, 2024, which are each hereby incorporated herein by reference in their entirety.

TECHNICAL FIELD

The present disclosure relates generally to power savings operations performed in a communication system, and more specifically to a system and method configured to determine and coordinate power loss in the communication system via a non-real time radio access network (RAN) intelligent controller (RIC).

SUMMARY

In one or more embodiments, systems and methods disclosed herein are configured to determine and coordinate power loss in the communication system via a non-real time radio access network (RAN) intelligent controller (RIC). The non-real time RIC may be a logical function that enables non-real-time control and optimization of RAN elements and resources, artificial intelligence (AI)/machine learning (ML) workflow including model training and updates, and policy-based guidance of applications and/or features in a near-real time RIC. In some embodiments, the systems may be configured to use the non-real time RIC to determine power loss in a given communication site using data from a radio unit (RU) and a power source at the given communication site. Herein, the systems may be configured to determine power loss at one or more connection interfaces (e.g., cables) connecting the RUs and the power source. The systems may be configured to calculate power at the connection interfaces at any given time based on power information provided by each RU and the power source. In this regard, power between the power source and each RU may be known at any time. The systems may be configured to: 1) determine power loss at a specific communication site caused by the connection interfaces; 2) provide an additional layer to control power consumption at the RUs in the specific communication site to a) regulate high voltage drop thresholds and b) low voltage drop thresholds; 3) determine connection interface decay over time; 4) inhibit, prevent, and/or mitigate power loss caused by deteriorated connection interfaces by instructing the power source to compensate for lost power; and 5) determine whether a contractor installed connection interfaces in accordance with predefined specifications by tracking power changes at each connection interface over time. In regard to (5), knowing specification sheets of connection interfaces to be installed by a given contractor, the non-real time RIC may determine an expected power loss at each connection interface. If an actual power loss at one or more connection interfaces does not match the expected power loss at each connection interface, the non-real time RIC may determine that replacement of a connection interface is not performed in accordance with the predefined specifications.

In one or more embodiments, the systems and methods described herein are integrated into a practical application to determine power loss of each connection interface in a communication site connecting an RU and a power source. In particular, the systems and methods are integrated into practical applications of: (1) monitoring power loss at each connection interface connecting a specific RU and a power source at a communication site at any point in time; (2) regulating, modifying, and/or controlling power thresholds at the RU based on power loss at the connection interfaces; (3) plotting and/or monitoring power losses at a specific connection interface over time; and (4) regulating, modifying, and/or controlling power output at the power source. The systems and methods may be configured to provide a deep understanding of power lost at any connection interface within a communication site. At a given point in time, the systems and methods may be configured to trigger replacement of any number of specific connection interfaces if power lost at the connection interfaces is determined to be outside a threshold. The threshold may be a dynamically updated threshold and/or a predefined threshold. In one or more embodiments, the systems may be configured to generate reports indicating when power may be determined to be lost in the connection interfaces.

In addition, the systems and methods described herein are integrated into a technical advantage of increasing processing speeds in a computer system, because processors associated with the systems and methods are configured to inhibit, prevent, and/or reduce power losses in a communication site. In some embodiments, the systems and methods are configured to increase processing speeds at the communication site by actively determining power losses in connection interfaces and modifying system configuration to account for the determined power losses in the communication site. Further, the systems and methods are integrated into a technical advantage of improving power consumption in a communication network comprising multiple communication sites by controlling power losses within one or more communication sites in the communication network. In this regard, the systems and methods are configured to perform one or more power saving operations that inhibit, prevent, and/or reduce power losses caused by connection interfaces in a communication site. Herein, decaying and/or malfunctioning connection interfaces may be determined based on the corresponding power loss caused to a communication site and replacement of these connection interfaces may be arranged promptly after determining their status.

In one or more embodiments, the systems and methods may be performed by an apparatus, such as a server (e.g., comprising the non-real time RIC), communicatively coupled to multiple network components in a core network, one or more base stations in a radio access network, and one or more user equipment. Further, the systems may be a wireless communication system, which comprises the apparatus. In addition, the systems may be performed as part of a process performed by the apparatus communicatively coupled to the network components in the core network. As a non-limiting example, the apparatus may comprise a memory and a processor communicatively coupled to one another. The memory may be configured to one or more configuration commands. Each configuration command may indicate one or more connection requirements to evaluate one or more power values. The processor may be configured to obtain a first power value associated with a local power source configured to provide power to a network component in a communication site. The local power source may be coupled to the network component via one or more connection interfaces. Further, the processor is configured to obtain a second power value associated with the network component and determine a power loss value associated with the one or more connection interfaces based on the first power value and the second power value. The power loss value may be representative of power lost during distribution of the first power value from the local power source to the first network component. The processor may be configured to determine whether the power loss value is within a predefined value range, generate one or more possible modifications to one or more of the configuration commands in response to determining that the power loss value is within the predefined value range, generate a report comprising the power loss value and the one or more possible modifications, and associate the report with the communication site.

Certain embodiments of this disclosure may comprise some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

EXAMPLE EMBODIMENTS

Figure 1:
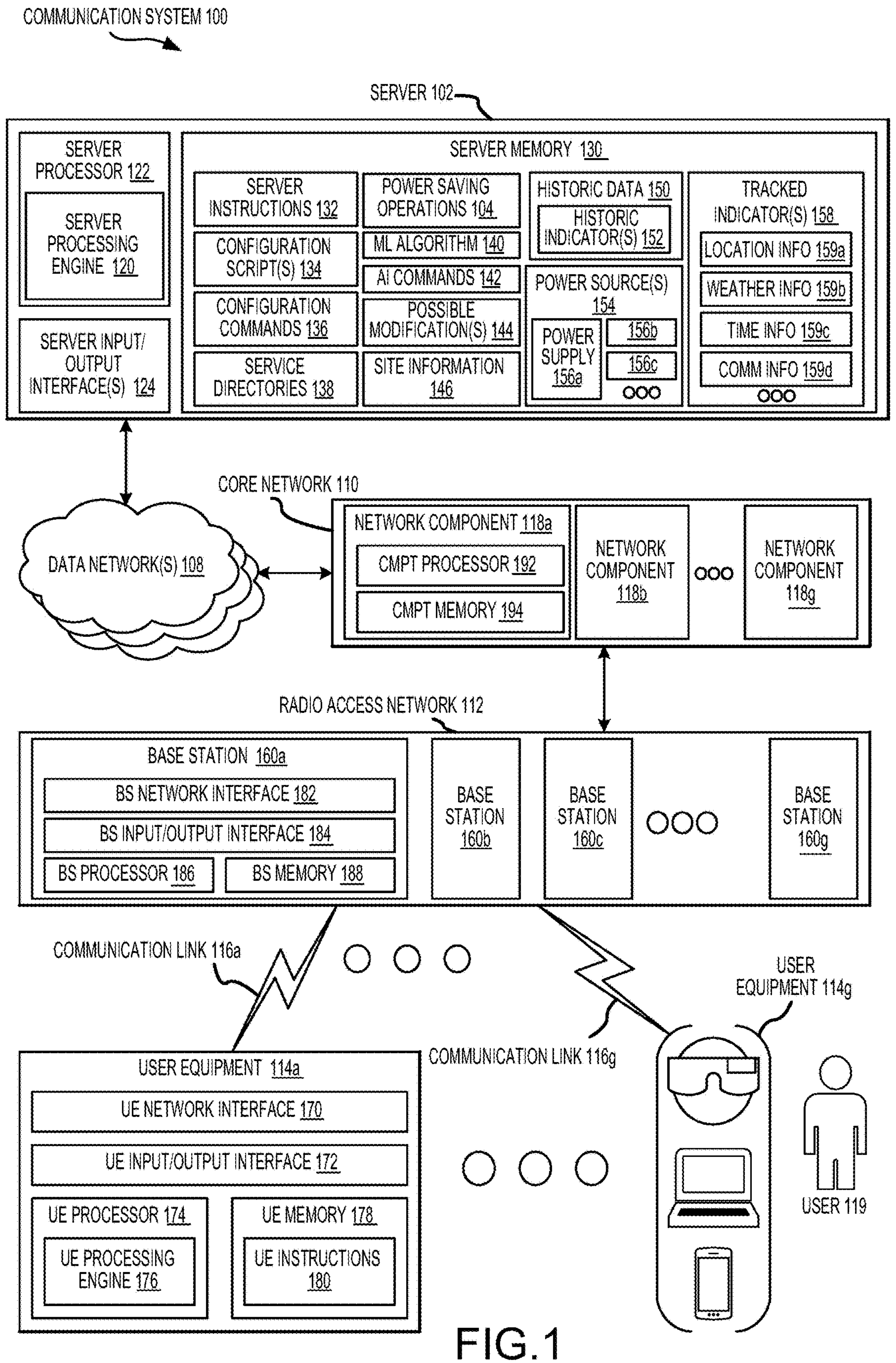
FIG. 1 illustrates an example communication system, in accordance with one or more embodiments.
Figure 2:
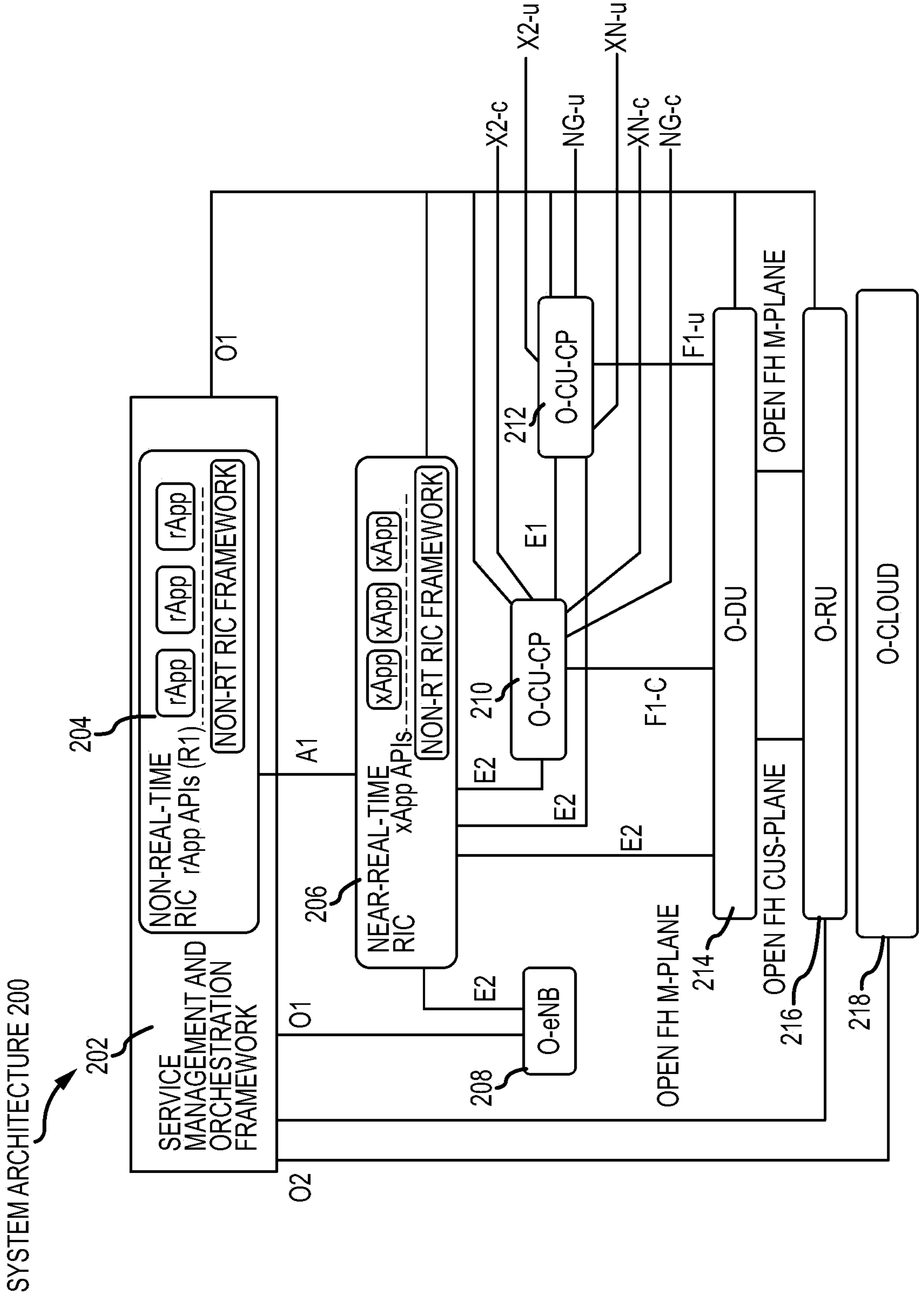
FIG. 2 illustrates a system architecture, in accordance with one or more embodiments.
Figure 3:
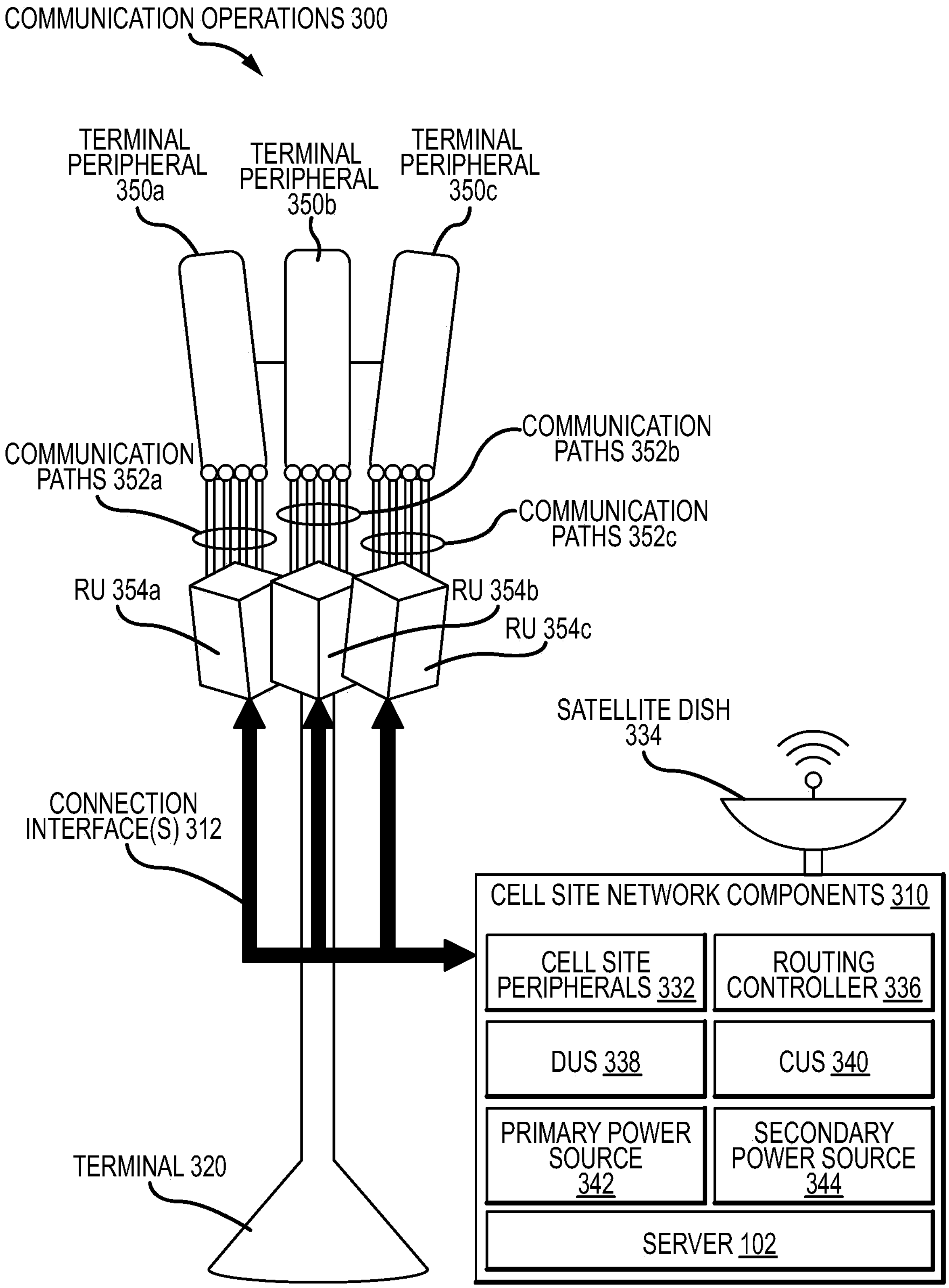
FIG. 3 illustrates an example of a communication site, in accordance with one or more embodiments.
Figure 4:
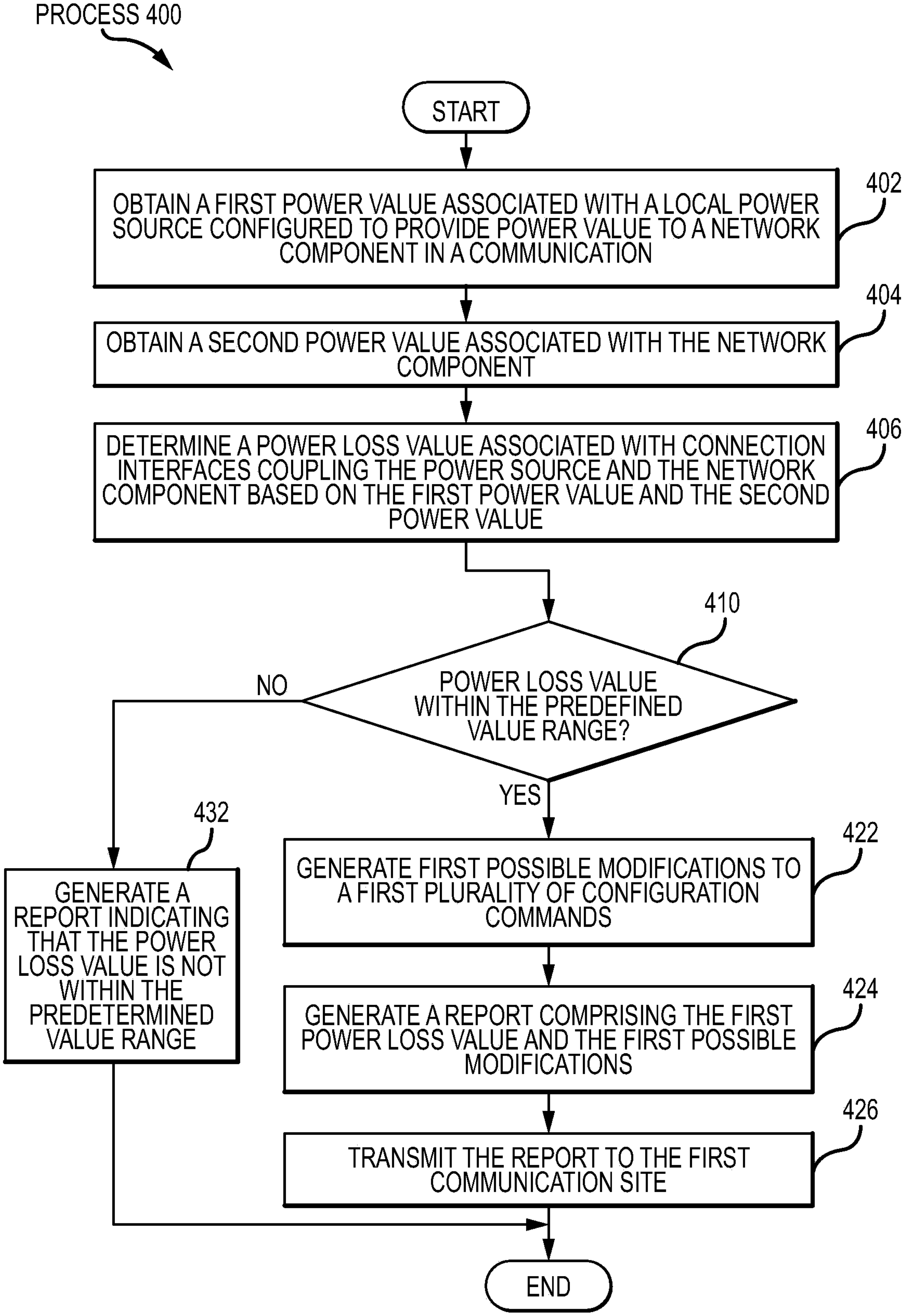
FIG. 4 illustrates an example flowchart of a method to perform one or more power saving operations, in accordance with one or more embodiments.
Figure 5:
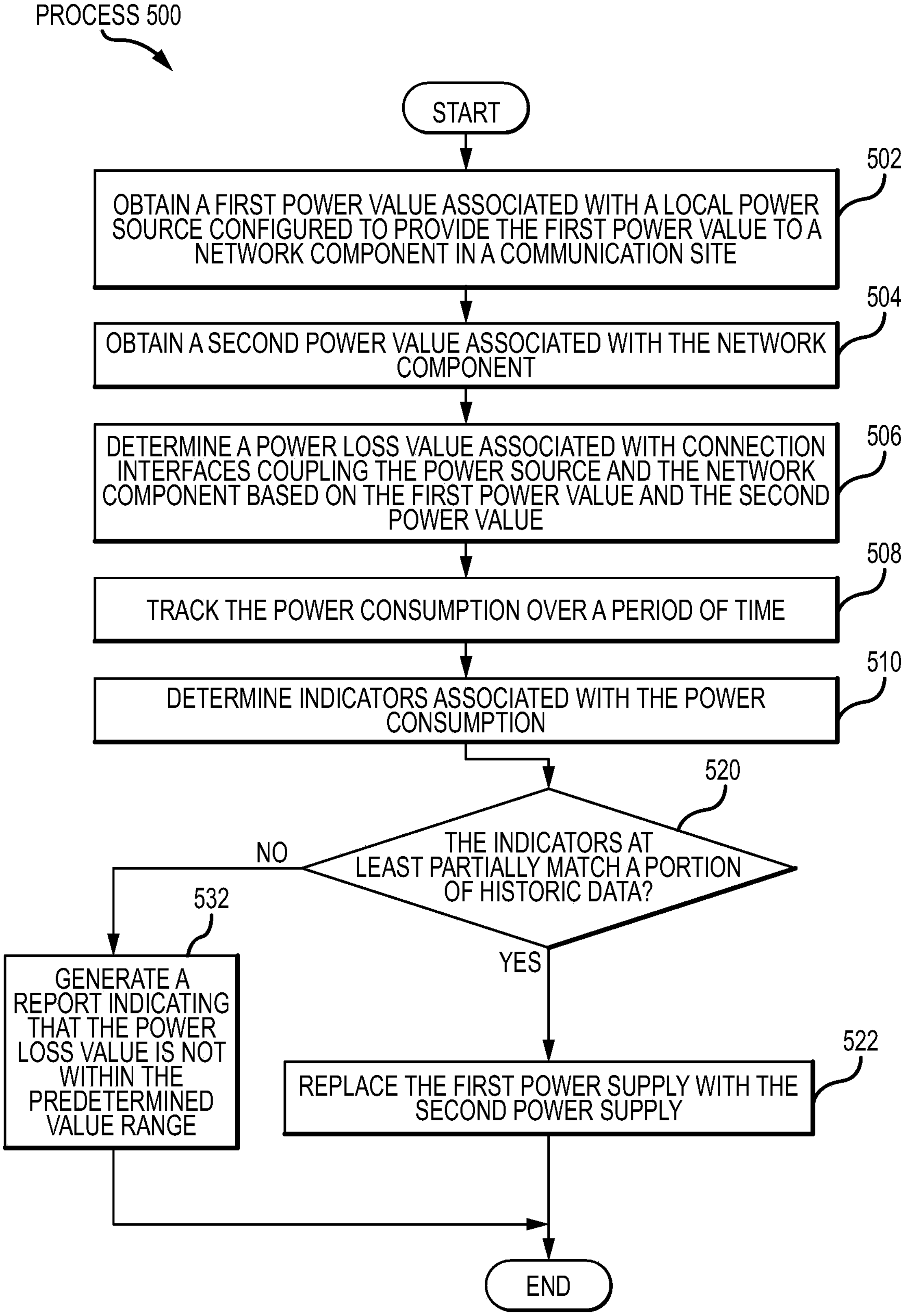
FIG. 5 illustrates an example flowchart of a method to perform one or more power saving operations, in accordance with one or more embodiments.

In one or more embodiments, systems and methods described herein are configured to determine and coordinate power loss in a communication system via a non-real time radio access network (RAN) intelligent controller (RIC). Further, the systems and methods described herein are configured to dynamically allocate power consumption in the communication system via the non-real time RIC. In one or more embodiments, FIG. 1 illustrates a communication system 100 in which a server 102 configured to determine and coordinate power loss in the communication system 100 and dynamically allocate power consumption in the communication system 100. FIG. 2 illustrates a system architecture 200 in which the communication system 100 of FIG. 1 is configured to communicate with one or more communication sites. FIG. 3 illustrates one or more communication operations 300 performed using the system architecture 200 of FIG. 2. FIG. 4 illustrates a process 400 to determine and coordinate power losses in the communication system 100. FIG. 5 illustrates a process 500 to dynamically allocate power consumption in the communication system 100.

Communication System Overview

FIG. 1 illustrates a diagram of a communication system 100 (e.g., a wireless communication system) that comprises a server 102 configured to perform one or more power saving operations 104, in accordance with one or more embodiments. In the communication system 100 of FIG. 1, the server 102 may be the communication terminal communicatively coupled to one or more data networks 108, a core network 110, and a radio access network (RAN) 112. In FIG. 1, the server 102 is communicatively coupled to multiple user equipment **114*a*-114*g* (collectively, user equipment 114) via the RAN 112 via multiple corresponding communication links 116*a*-116*g* (collectively, communication links 116) established between each user equipment 114 and the RAN 112. As represented by a user equipment 114*a*, the user equipment 114 may be operated or attended by one or more users 119. In the example of FIG. 1, the server 102 may be communicatively coupled to multiple additional devices in the communication system 100. While FIG. 1 shows the server 102 connected directly to the one or more data networks 108, the server 102 may be located inside the core network 110 as part of one or more of the network components (e.g., any of the network components 118*a*-118*g*) in the core network 110**.

In one or more embodiments, the communication system 100 comprises the user equipment 114, the RAN 112, the core network 110, the one or more data networks 108, and the server 102. In come embodiments, the communication system 100 may comprise a Fifth Generation (5G) mobile network or wireless communication system, utilizing high frequency bands (e.g., 24 Gigahertz (GHz), 39 GHz, and the like) or lower frequency bands such (e.g., Sub 6 GHZ). In this regard, the communication system 100 may comprise a large number of antennas. In some embodiments, the communication system may perform one or more operations associated with the 5G New Radio (NR) protocols described in reference to the Third Generation Partnership Project (3GPP). As part of the 5G NR protocols, the communication system 100 may perform one or more millimeter (mm) wave technology operations to improve bandwidth or latency in wireless communications.

In some embodiments, the communication system 100 may be configured to partially or completely enable communications via one or more various radio access technologies (RATs), wireless communication technologies, or telecommunication standards, such as Global System for Mobiles (GSM) (e.g., Second Generation (2G) mobile networks), Universal Mobile Telecommunications System (UMTS) (e.g., Third Generation (3G) mobile networks), Long Term Evolution (LTE) of mobile networks, LTE-Advanced (LTE-A) mobile networks, 5G NR mobile networks, or Sixth Generation (6G) mobile networks.

Communication System Components

Server

The server 102 is generally any device or apparatus that is configured to process data, communicate with the data networks 108, one or more network components **118*a*-118*g* (collectively, network components 118) in the core network 110, the RAN 112, and the user equipment 114. The server 102 may be configured to monitor, track data, control routing of signal, and control operations of certain electronic components in the communication system 100, associated databases, associated systems, and the like, via one or more interfaces. The server 102 is generally configured to oversee operations of the server processing engine 120. The operations of the server processing engine 120 are described further below. In some embodiments, the server 102 comprises a server processor 122, one or more server Input (I)/Output (O) interfaces 124, and a server memory 130 communicatively coupled to one another. The server 102 may be configured as shown, or in any other configuration. As described above, the server 102 may be located in one of the network components 118 located in the core network 110** and may be configured to perform one or more network functions (NFs).

The server processor 122 may comprise one or more processors operably coupled to and in signal communication with the one or more server I/O interfaces 124, and the server memory 130. The server processor 122 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The server processor 122 may be a programmable logic device, a microcontroller, a microprocessor, or any suitable combination of the preceding. The one or more processors in the server processor 122 are configured to process data and may be implemented in hardware or software executed by hardware. For example, the server processor 122 may be an 8-bit, a 16-bit, a 32-bit, a 64-bit, or any other suitable architecture. The server processor 122 may comprise an arithmetic logic unit (ALU) to perform arithmetic and logic operations, processor registers that supply operands to the ALU, and store the results of ALU operations, and a control unit that fetches software instructions such as server instructions 132 from the server memory 130 and executes the server instructions 132 by directing the coordinated operations of the ALU, registers and other components via the server processing engine 120. The server processor 122 may be configured to execute various instructions. For example, the server processor 122 may be configured to execute the server instructions 132 to perform functions or perform operations disclosed herein, such as some or all of those described with respect to FIGS. 1-5. In some embodiments, the functions described herein are implemented using logic units, FPGAs, ASICs, DSPs, or any other suitable hardware or electronic circuitry.

In one or more embodiments, the server I/O interfaces 124 may be hardware configured to perform one or more communication operations 300 described in reference to FIG. 3. The server I/O interfaces 124 may comprise one or more antennas as part of a transceiver, a receiver, or a transmitter for communicating using one or more wireless communication protocols or technologies. In some embodiments, the server I/O interfaces 124 may be configured to communicate using, for example, NR or LTE using at least some shared radio components. In other embodiments, the server I/O interfaces 124 may be configured to communicate using single or shared radio frequency (RF) bands. The RF bands may be coupled to a single antenna, or may be coupled to multiple antennas (e.g., for a multiple-input multiple output (MIMO) configuration) to perform wireless communications. The server I/O interfaces 124 may be configured to comprise one or more peripherals such as a network interface, one or more administrator interfaces, and one or more displays.

The server network interfaces that may be part of the server I/O interfaces 124 may be any suitable hardware or software (e.g., executed by hardware) to facilitate any suitable type of communication in wireless or wired connections. These connections may comprise, but not be limited to, all or a portion of network connections coupled to additional network components 118 in the core network 110, the RAN 112, the user equipment 114, the Internet, an Intranet, a private network, a public network, a peer-to-peer network, the public switched telephone network, a cellular network, a local area network (LAN), a metropolitan area network (MAN), a wide area network (WAN), and a satellite network. The server network interface may be configured to support any suitable type of communication protocol.

The one or more administrator interfaces that may be part of the server I/O interfaces 124 may be user interfaces configured to provide access and control to of the server 102 to one or more users (e.g., the user 119) or electronic devices. The one or more users may access the server memory 130 upon confirming one or more access credentials to demonstrate that access or control to the server 102 may be modified. In some embodiments, the one or more administrator interfaces may be configured to provide hardware and software resources to the one or more users. Examples of user devices comprise, but are not limited to, a laptop, a computer, a smartphone, a tablet, a smart device, an Internet-of-Things (IoT) device, a simulated reality device, an augmented reality device, or any other suitable type of device. The administrator interfaces may enable access to one or more graphical user interfaces (GUIs) via an image generator display (e.g., one or more displays), a touchscreen, a touchpad, multiple keys, multiple buttons, a mouse, or any other suitable type of hardware that allow users to view data or to provide inputs into the server 102. The server 102 may be configured to allow users to send requests to one or more user equipment 114.

In the example of FIG. 1, the one or more displays that may be part of the server I/O interfaces 124 may be configured to display a two-dimensional (2D) or three-dimensional (3D) representation of a service. Examples of the representations may comprise, but are not limited to, a graphical or simulated representation of an application, diagram, tables, or any other suitable type of data information or representation. In some embodiments, the one or more displays may be configured to present visual information to one or more users (not shown). The one or more displays may be configured to present visual information to the one or more users updated in real-time. The one or more displays may be a wearable optical display (e.g., glasses or a head-mounted display (HMD)) configured to reflect projected images and enable user to see through the one or more displays. For example, the one or more displays may comprise display units, one or more lenses, one or more semi-transparent mirrors embedded in an eye glass structure, a visor structure, or a helmet structure. Examples of display units comprise, but are not limited to, a cathode ray tube (CRT) display, a liquid crystal display (LCD), a liquid crystal on silicon (LCOS) display, a light emitting diode (LED) display, an organic LED (OLED) display, an active-matrix OLED (AMOLED) display, a projector display, or any other suitable type of display. In another embodiment, the one or more displays are a graphical display on the server 102. For example, the graphical display may be a tablet display or a smartphone display configured to display the data representations.

The server memory 130 may be volatile or non-volatile and may comprise a read-only memory (ROM), random-access memory (RAM), ternary content-addressable memory (TCAM), dynamic random-access memory (DRAM), and static random-access memory (SRAM). The server memory 130 may be implemented using one or more disks, tape drives, solid-state drives, and/or the like. The server memory 130 is operable to store the server instructions 132, one or more configuration scripts 134, one or more existing configuration commands 136, one or more service directories 138, the one or more power saving operations 104, a machine learning algorithm 140, multiple artificial intelligence commands 142, communication site information 146, historical data 150 comprising one or more historic indicators 152 (e.g., one or more Key Performance Indicators (KPIs)), one or more power sources 154 comprising connections for a power supply 156*a*, a power supply 156*b*, and a power supply 156*c* (collectively, power supplies 156) among others, and one or more tracked indicators 158 comprising location information 159*a*, weather information 159*b*, time information 159*c*, and/or communication information 159*d*. In the server memory 130, the server instructions 132 may comprise commands and controls for operating one or more specific NFs in the core network 110 when executed by the server processing engine 120 of the server processor 122.

In one or more embodiments, the one or more configuration scripts 134 are configured to instruct one or more network components 118 in the core network 110 to establish one or more configuration commands 136 to perform one of the power saving operations 104 and/or additional operations. The one or more configuration scripts 134 enable automation of the routing and configuration of network components 118 in the core network 110. In this regard, the one or more configuration scripts 134 may reconfigure multiple cloud-NFs (CNFs) that establish initial communication sessions with at least one NRF in a communication path comprising one or more additional network components 118. In this regard, the one or more configuration scripts 134 instruct routing and configuration of communication procedures based on static routing commands to restore restores services in the core network 110.

In one or more embodiments, the configuration commands 136 are configured to establish one or more communication sessions between the network components 118 in the core network 110 and the user equipment 114. Each configuration command of the configuration commands 136 may be configured to provide control information to perform one or more of the operations. Further, the configuration commands 136 may be routing and configuration information for reinstating or reestablishing communication sessions. The configuration commands 136 may comprise one or more power consumption guidelines. The configuration commands 136 may be dynamically or periodically updated from the network components 118 in the core network 110. In one or more embodiments, the power saving operations 104 are one or more operations performed to inhibit, reduce, and/or prevent power loss. Further, the power saving operations 104 are one or more operations regulate and/or control power consumption. The power saving operations 104 may be configured to provide control information to perform one or more operations based at least in part upon analyzed data from one or more communication operations. The power saving operations 104 may be routing and configuration information for establishing, reinstating, and/or reestablishing communication sessions between the server 102 and one or more network components 118, one or more base stations 160, and/or one or more user equipment 114. The power saving operations 104 may be dynamically or periodically updated based on one or more rules and policies.

The service directories 138 may be configured to store service-specific information and/or user-specific information. The service directories 138 may enable the server 102 to confirm user credentials to access one or more network components (e.g., one of the network components 118 configured to perform one or more NFs in the core network 110). The service directories 138 may be configured to store provider-specific information. The service directories 138 may enable the server 102 to validate credentials associated with a specific provider (e.g., one of the CNFs) against corresponding user-specific information in the service directories 138.

In one or more embodiments, the machine learning algorithm 140 may be configured to convert the data obtained as part of the power saving operations 104 to generate structured data for further analysis. Further, the machine learning algorithm 140 may be configured to interpret and analyze the site information 146 and the historical data 150 into structured data sets and subsequently stored as files or tables. The machine learning algorithm 140 may cleanse, normalize raw data, and derive intermediate data to generate uniform data in terms of encoding, format, and data types. The machine learning algorithm 140 may be executed to run user queries and advanced analytical tools on the structured data. The machine learning algorithm 140 may be configured to generate the one or more artificial intelligence commands 142 based on current communication operations and the existing configuration commands 136. In turn, the power saving operations 104 may be configured to generate reports based on one or more outputs of the machine learning algorithm 140. The artificial intelligence commands 142 may be parameters that modify routing of resources in the configuration scripts 134 to be allocated in the communication network. The artificial intelligence commands 142 may be combined with the existing configuration commands 136 to create the power saving operations 104.

In some embodiments, the machine learning algorithm 140 may be configured to generate the one or more artificial intelligence commands 142 based on the existing configuration commands 136. In turn, the server processor 122 may be configured to generate the possible modifications 144 based on one or more outputs of the machine learning algorithm 140. The artificial intelligence commands 142 may be parameters that modify the possible modifications 144. The artificial intelligence commands 142 may be combined with the existing configuration commands 136 to create the possible modifications 144. In one or more embodiments, the possible modifications 144 may be dynamically generated updates for the existing configuration commands 136.

The possible modifications 144 may be recommendations presented to the network components 118, the base stations 160, and/or the user equipment 114 based on the site information 146 and the historical data 150. The possible modifications 144 may comprise one or more dynamic suggestions to modify the one or more configuration commands 136. In one or more embodiments, the dynamic suggestions are the one or more power saving operations 104 configured to control operations of the server 102. The power saving operations 104 may be configured to dynamically provide control information to perform one or more of the operations based at least in part upon the analyzed site information 146 and historical data 150.

The site information 146 may be information associated with the server 102. Herein, the site information 146 comprises operational information and physical information among other types of information. The operational information may be information indicating one or more operations performed by a given base station 160 in the communication system 100. For example, the operational information may comprise indicators of one or more routing preferences for communication channels accessible to the given base station 160. The physical information may be information indicative of physical measurements of the given base station 160 and/or surrounding areas of the given base station 160 on Earth. For example, the physical information may comprise one or more physical details of the given base station 160. The physical details may comprise information on one or more antennas (e.g., height, width, power output, and the like) attached to the given base station 160, the infrastructure associated with the given base station 160 (e.g., height and/or materials of the infrastructure comprising the given base station 160), and the weather surrounding the given base station 160 over the period of time among others.

In some embodiments, the site information is predefined information received by the given base station 160 during a maintenance window. In other embodiments, the site information is dynamically modified information that is received by the given base station 160 outside of a maintenance window. In one or more embodiments, the server may receive and/or update the site information statically (e.g., predefined) and/or dynamically over time. In some embodiments, the site information may be updated in accordance with rules and policies of an organization.

The historical data 150 may be historic information associated with one or more communication sites in a communication network comprising several communication sites. The historical data 150 may comprise one or more historic indicators 152 representing one or more trends associated with power consumption for a specific communication site, a group of communication sites, and/or several communication sites in the communication network.

The power sources 154 may be one or more sources of power configured to supply power to one or more communication sites communicatively coupled to the server 102. The power sources 154 may comprise a powers supply 156*a* corresponding to a local battery configured to store energy at a given location. The given location may be located at a communication site or at a distance from any communication sites. In another example, the power supply 156*b* may be a connection to a power grid (e.g., micro or regional) and the power supply 156*c* may be a connection to a local power generator. In one or more embodiments, the power sources 154 are sources (e.g., location and/or protocols) of power transmissions, while the power supplies 156 are specific approaches of converting power for distribution in the server 102. For example, types of power sources 154 may comprise a power grid connection from a utility company, an on-site battery, and/or another communication site among others. In some embodiments, the power sources 154 are sources of power transmissions in the server 102 and/or a communication site. Further, the power supplies 156 are hardware and/or software (executed by hardware) configured to convert power from a specific source into a format and/or a voltage suitable for the server 102. The power supplies 156 may comprise one or more power converters configured to convert power from a first format to a second format. For example, the power supplies 156 may comprise one or more rectifiers configured to convert power from alternating current (AC) to direct current (DC).

The tracked indicators 158 may comprise some, many, or several indicators. The tracked indicators 158 may comprise location information 159*a*, weather information 159*b*, time information 159*c*, and communication information 159*d* among others.

User Equipment

In one or more embodiments, each of the user equipment 114 (e.g., the user equipment 114*a* and a user equipment 114*g* representative of the user equipment 114*a*-114*g*) may be any computing device configured to communicate with other devices, such as the server 102, other network components 118 in the core network 110, databases, and the like in the communication system 100. Each of the user equipment 114 may be configured to perform specific functions described herein and interact with one or more network components 118 in the core network 110 via one or more base stations 160. Examples of user equipment 114 comprise, but are not limited to, a laptop, a computer, a smartphone, a tablet, a smart device, an IoT device, a simulated reality device, an augmented reality device, or any other suitable type of device.

In one or more embodiments, referring to the user equipment 114*a* as a non-limiting example of the user equipment 114, the user equipment 114*a* may comprise a user equipment (UE) network interface 170, a UE I/O interface 172, a UE processor 174 configured to execute a UE processing engine 176, and a UE memory 178 comprising one or more UE instructions 180. The UE network interface 170 may be any suitable hardware or software (e.g., executed by hardware) to facilitate any suitable type of communication in wireless or wired connections. These connections may comprise, but not be limited to, all or a portion of network connections coupled to additional network components 118 in the core network 110, the RAN 112, the Internet, an Intranet, a private network, a public network, a peer-to-peer network, the public switched telephone network, a cellular network, a local area network (LAN), a metropolitan area network (MAN), a wide area network (WAN), and a satellite network. The UE network interface 170 may be configured to support any suitable type of communication protocol.

The UE I/O interface 172 may be hardware configured to perform one or more communication operations 300 described in reference to FIG. 3. The UE I/O interface 172 may comprise one or more antennas as part of a transceiver, a receiver, or a transmitter for communicating using one or more wireless communication protocols or technologies. In some embodiments, the UE I/O interface 172 may be configured to communicate using, for example, 5G NR or LTE using at least some shared radio components. In other embodiments, the UE I/O interface 172 may be configured to communicate using single or shared RF bands. The RF bands may be coupled to a single antenna, or may be coupled to multiple antennas (e.g., for a MIMO configuration) to perform wireless communications. In some embodiments, the user equipment 114*a* may comprise capabilities for voice communication, mobile broadband services (e.g., video streaming, navigation, and the like), or other types of applications. In this regard, the UE I/O interface 172 of the user equipment 114*a* may communicate using machine-to-machine (M2M) communication, such as machine-type communication (MTC), or another type of M2M communication.

In some embodiments, the user equipment 114*a* is communicatively coupled to one or more of the base stations 160 via one or more communication links 116 (e.g., the communication link 116*a* and the communication link 116*g* representative of the communication links 116). The user equipment 114*a* may be a device with cellular communication capability such as a mobile phone, a hand-held device, a computer, a laptop, a tablet, a smart watch or other wearable device, or virtually any type of wireless device. In some applications, the user equipment 114 may be referred to as a UE, UE device, or terminal.

The UE processor 174 may comprise one or more processors operably coupled to and in signal communication with the UE network interface 170, the UE I/O interface 172, and the UE memory 178. The UE processor 174 is any electronic circuitry, including, but not limited to, state machines, one or more CPU chips, logic units, cores (e.g., a multi-core processor), FPGAs, ASICs, or DSPs. The UE processor 174 may be a programmable logic device, a microcontroller, a microprocessor, or any suitable combination of the preceding. The one or more processors in the UE processor 174 are configured to process data and may be implemented in hardware or software executed by hardware. For example, the UE processor 174 may be an 8-bit, a 16-bit, a 32-bit, a 64-bit, or any other suitable architecture. The UE processor 174 comprises an ALU to perform arithmetic and logic operations, processor registers that supply operands to the ALU, and store the results of ALU operations, and a control unit that fetches software instructions such as the UE instructions 180 from the UE memory 178 and executes the UE instructions 180 by directing the coordinated operations of the ALU, registers, and other components via the UE processing engine 176. The UE processor 174 may be configured to execute various instructions. For example, the UE processor 174 may be configured to execute the UE instructions 180 to implement functions or perform operations disclosed herein, such as some or all of those described with respect to FIGS. 1-5. In some embodiments, the functions described herein are implemented using logic units, FPGAs, ASICs, DSPs, or any other suitable hardware or electronic circuitry.

Radio Access Network

In one or more embodiments, the RAN 112 enables the user equipment 114 to access one or more services in the core network 110. The one or more services may be a mobile telephone service, a Short Message Service (SMS) message service, a Multimedia Message Service (MMS) message service, an Internet access, cloud computing, or other types of data services. The RAN 112 may comprise the base stations 160 in signal communication with the user equipment 114 via the one or more communication links 116. Each of the base stations 160 may service the user equipment 114. In some embodiments, while multiple base stations 160 are shown connected to multiple user equipment 114 via the communication link 116, one or more additional base stations 160 may be connected to one or more additional user equipment 114 via one or more additional communication links 116. For example, the base station 160*a*-110*g* may exchange connectivity signals with the user equipment 114*a* via the communication link 116*a*. In another example, the base station 160G may exchange connectivity signals with the user equipment 114*g* via the communication link 116*g*. In yet another example, the base stations 160 may service some user equipment 114 located within a geographic area serviced by one of the base stations 160.

In one or more embodiments, referring to the base station 160*a* as a non-limiting example of the base station 160, the base station 160*a* may comprise a base station (BS) network interface 182, a BS I/O interface 184, a BS processor 186, and a BS memory 188. The BS network interface 182 may be any suitable hardware or software (e.g., executed by hardware) to facilitate any suitable type of communication in wireless or wired connections between the core network 110 and the user equipment 114. These connections may comprise, but not be limited to, all or a portion of network connections coupled to additional network components 118 in the core network 110, other base stations 160, the user equipment 114, the Internet, an Intranet, a private network, a public network, a peer-to-peer network, the public switched telephone network, a cellular network, a LAN, a MAN, a WAN, and a satellite network. The BS network interface 182 may be configured to support any suitable type of communication protocol.

The BS I/O interface 184 may be hardware configured to perform one or more communication operations 300 described in reference to FIG. 3. The BS I/O interface 184 may comprise one or more antennas as part of a transceiver, a receiver, or a transmitter for communicating using one or more wireless communication protocols or technologies. In some embodiments, the BS I/O interface 184 may be configured to communicate using, for example, 5G NR or LTE using at least some shared radio components. In other embodiments, the BS I/O interface 184 may be configured to communicate using single or shared RF bands. The RF bands may be coupled to a single antenna, or may be coupled to multiple antennas (e.g., for a MIMO configuration) to perform wireless communications. In some embodiments, the base station 160A may allocate resources in accordance with one or more routing and configuration operations obtained from the core network 110. In some embodiments, resources may be allocated to enable capabilities in the user equipment 114 for voice communication, mobile broadband services (e.g., video streaming, navigation, and the like), or other types of applications.

In some embodiments, the base station 160A is communicatively coupled to one or more of the user equipment 114 via the one or more communication links 116. In some applications, the base stations 160*a* may be referred to as BS, evolved Node B (eNodeB or eNB), a next generation Node B, gNodeB, gNB, or terminal.

The BS processor 186 may comprise one or more processors operably coupled to and in signal communication with the BS network interface 182, the BS I/O interface 184, and the BS memory 188. The BS processor 186 is any electronic circuitry, including, but not limited to, state machines, one or more CPU chips, logic units, cores (e.g., a multi-core processor), FPGAs, ASICs, or DSPs. The BS processor 186 may be a programmable logic device, a microcontroller, a microprocessor, or any suitable combination of the preceding. The one or more processors in the BS processor 186 are configured to process data and may be implemented in hardware or software executed by hardware. For example, the BS processor 186 may be an 8-bit, a 16-bit, a 32-bit, a 64-bit, or any other suitable architecture. The BS processor 186 comprises an ALU to perform arithmetic and logic operations, processor registers that supply operands to the ALU, and store the results of ALU operations, and a control unit that fetches software instructions (not shown) from the BS memory 188 and executes the software instructions by directing the coordinated operations of the ALU, registers, and other components via a processing engine (not shown) in the BS processor 186. The BS processor 186 may be configured to execute various instructions. For example, the BS processor 186 may be configured to execute the software instructions to implement functions or perform operations disclosed herein, such as some or all of those described with respect to FIGS. 1-5. In some embodiments, the functions described herein are implemented using logic units, FPGAs, ASICs, DSPs, or any other suitable hardware or electronic circuitry.

Core Network

The core network 110 may be a network configured to manage communication sessions for the user equipment 114. In one or more embodiments, the core network 110 may establish connections between user equipment 114 and a particular data network 108 in accordance with one or more communication protocols. In the example of FIG. 1, the core network 110 comprises one or more network components configured to perform one or more NFs. In some embodiments, the core network 110 enables the user equipment 114 to communicate with the server 102, or another type of device, located in a particular data network 108 or in signal communication with a particular data network 108. The core network 110 may implement a communication method that does not require the establishment of a specific communication protocol connection between the user equipment 114 and one or more of the data networks 108. The core network 110 may include one or more types of network devices (not shown), which may perform different NFs.

In some embodiments, the core network 110 may include a 5G NR or an LTE access network (e.g., an evolved packet core (EPC) network) among others. In this regard, the core network 110 may comprise one or more logical networks implemented via wireless connections or wired connections. Each logical network may comprise an end-to-end virtual network with dedicated power, storage, or computation resources. Each logical network may be configured to perform a specific application comprising individual policies, rules, or priorities. Further, each logical network may be associated with a particular Quality of Service (QOS) class, type of service, or particular user associated with one or more of the user equipment 114. For example, a logical network may be a Mobile Private Network (MPN) configured for a particular organization. In this example, when the user equipment 114*a* is configured and activated by a wireless network associated with the RAN 112, the user equipment 114*a* may be configured to connect to one or more particular network slices (i.e., logical networks) in the core network 110. Any logical networks or slices that may be configured for the user equipment 114*a* may be configured using a network component (e.g., one of the network components 118 (e.g., the network component 118*a*, the network component 118*b*, and the network component 118*g* representing the network component 118*a*-118*g*) of FIG. 1.

In one or more embodiments, each of the network components 118 may comprise a component processor 192 configured to perform one or more similar operations to those described in reference to the BS processor 186 and the UE processor 174. In other embodiments, each of the network components 118 may comprise a component memory 194 configured to perform one or more similar operations to those described in reference to the BS memory 188 and the UE memory 178.

Data Networks

In the example system 100 of FIG. 1, the data networks 108 may facilitate communication within the communication system 100. This disclosure contemplates that the data networks 108 may be any suitable network operable to facilitate communication between the server 102, the core network 110, the RAN 112, and the user equipment 114. The data networks 108 may include any interconnecting system capable of transmitting audio, video, signals, data, messages, or any combination of the preceding. The data networks 108 may include all or a portion of a LAN, a WAN, an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, and the like), a Long Term Evolution (LTE) network, a Universal Mobile Telecommunications System (UMTS) network, a peer-to-peer (P2P) network, a Bluetooth network, a Near Field Communication network, a Zigbee network, or any other suitable network, operable to facilitate communication between the components of the communication system 100. In other embodiments, the communication system 100 may not have all of these components or may comprise other elements instead of, or in addition to, those above.

System Architecture

FIG. 2 illustrates an example system architecture 200 for an open (O)-RAN logic architecture, in accordance with one or more embodiments. The system architecture 200 may comprise some, all, or any of the components performing the functions and/or as described in technical specification (TS) produced by working group 2 (WG2) of the O-RAN Alliance O-RAN.WG2.Non-RT-RIC-ARCH-R003-v05.00, TS produced by WG4 of the O-RAN Alliance O-RAN.WG4.MP.0-R003-v14.00, and/or 3GPP TR 21.905.

In one or more embodiments, the system architecture 200 comprises a service management and orchestration framework (SMO-F) 202 comprising a non-real time RIC 204, a near-real time RIC 206, an O-eNB 208, an O-control unit (CU)-control plane (CP) 210, an O-CU-user plane (UP) 212, an O-distributed unit (DU) 214, an O-radio unit (RU) 216, and an O-Cloud 218. The SMO-F 202 is communicatively coupled to the O-DU 214 and the O-RU 216 via an O1 interface, the O-RU 216 via an open fronthaul (FH)-management (M)-plane interface, the O-cloud via an O2 interface, and the O-eNB 208 via one or more O1 interfaces. The near-real time RIC 206 may be communicatively coupled to the O-eNB 208, the O-CU-CP 210, the O-CU-UP 212, and the O-DU via one or more E2 interfaces, the non-real time RIC 204 via an A1 interface, and the SMO-F 202, the O-CU-CP 210, and the O-CU-UP 212 via one or more O1 interfaces. The O-CU-CP 210 may be communicatively coupled to the O-DU 214 via an interface of the control plane of the F1 (F1-C interface). The O-CU-UP 212 may be communicatively coupled to the O-DU 214 via an interface of the user plane of the F1 (F1-U interface). The O-DU 214 may be communicatively coupled to the O-RU 216 via an open FH control user synchronization (CUS)-plane and an open FH M-plane. The O-CU-CP 210 may be communicatively coupled to the O-CU-UP 212 via an E1 interface. The O-CU-CP 210 and/or the O-CU-UP 212 may be configured to communicate using multiple additional interfaces. In FIG. 2, these interfaces comprise an X2-c interface, an X2-u interface, an NG-u interface, an Xn-u interface, an Xn-c interface, and an NG-c interface. The non-real time RIC 204 and the near-real time RIC 206 may share a non-RT RIC framework. The non-real time RIC 204 may comprise one or more non-real time network automation applications (rAPPs). In some embodiments, the non-real time RIC 204 may be the server 102. The near-real time RIC 206 may comprise one or more near-real time network automation applications (xAPPs).

In one or more embodiments, the near-real time RIC 206 may be an intelligent controller configured to perform one or more logical operations that enable near-real-time control and optimization of O-RAN elements and resources via fine-grained data collection and actions over the E2 interface. The non-real-time RIC 204 may be an intelligent controller configured to perform one or more logical operations that enable non-real-time control and optimization of RAN elements and resources, workflow associated with artificial intelligence and/or machine learning (ML) elements including model training, updates, and policy-based guidance of applications, features, and/or services. The O-CU may be a logical node hosting radio resource control (RRC), service data adaptation protocol (SDAP), and packet data convergence protocol (PDCP) protocols. The O-CU-CP 210 may be a logical node hosting RRC and control plane portions of the PDCP protocols. The O-CU-UP 212 may be a logical node hosting user plane portions of the PDCP protocol and the SDAP protocol. The O-DU 214 may be a logical node hosting radio link control (RLC) elements, medium access control (MAC) elements, and/or physical (PHY) layer elements (e.g., the layers themselves) based on a lower layer functional split. The O-RU 216 may be a logical node hosting PHY layer elements and radiofrequency (RF) processing based on a lower layer functional split.

In some embodiments, the one or more O1 interfaces may be connection interfaces between management entities in the SMO-F 202 and O-RAN managed elements. The one or more xAPPs may be independent service plug-ins to the near-real time RIC 206 platform to provide operations extensibility to the RAN by third parties. The one or more E2 interfaces may be open interfaces between two end points (e.g., the near-real time RIC 206 and network elements associated with one or more E2 interfaces (e.g., DUs, CUs, and the like). In some embodiments, the one or more E2 interfaces are configured to allow the non-real time RIC 204 to control procedures and functionalities of network elements associated with one or more E2 interfaces (e.g., E2 nodes). The one or more F1 interfaces may be configured to connect a gNB CU to a gNB DU. The one or more F1 interfaces may be associated with CU and DU splits in gNB architecture. The control plane of the F1 (F1-C) may allow signaling between the CU and DU, while the user plane of the F1 (F1-U) may allow the transfer of application data.

The open fronthaul interface may be configured to connect the O-DU 214 and the O-RU 216. Herein, the open fronthaul interface may comprise a management plane (M-Plane) and a control user synchronization plane (CUS-Plane). The M-Plane may be configured to connect the O-RU to the O-DU and/or the O-RU to the SMO-F 202. The one or more A1 interfaces may enable communication between the non-real time RIC 204 and the near-real time RIC 206. Further, the A1 interfaces may be configured to support policy management, data transfer, and ML management. The one or more O1 interfaces may be configured to connect the SMO-F 202 to one or more RAN-managed elements. These RAN-managed elements comprise the near-real time RIC 206, the O-CU, the O-DU, the O-RU, and the O-eNB. In some embodiments, management and orchestration operations may be received by the managed elements via the O1 interface. The SMO-F 202 in turn may receive data from the managed elements via the one or more O1 interfaces for AI model training. The one or more O2 interfaces may be pathways to communicate between the SMO-F with the O-Cloud 218. In one or more embodiments, network operators that are connected to the O-Cloud 218 may then operate and maintain a communication network with the one or more O1 interfaces or the one or more O2 interfaces by reconfiguring network elements, updating the system 100, or upgrading the system 100. The one or more X2 interfaces may comprise the X2-c interfaces and the X2-u interfaces. The X2-u interfaces may be configured to enable operations associated with the control plane. The X2-c interfaces may be configured to enable operations associated with the user plane. The Xn interfaces may comprise a control subtype labeled Xn-c and a user subtype labeled Xn-u. The NG interfaces may comprise a control subtype labeled NG-c and a user subtype labeled NG-u.

Example Communication Operations of a Communication Site

FIG. 3 illustrates one or more communication operations 300 in accordance with one or more embodiments. The communication operations 300 may be performed by the server 102 and/or the non-real time RIC 204. In the non-limiting example of FIG. 3, the communication operations 300 may be performed by the server 102 and/or the non-real time RIC 204. In the example of FIG. 3, the server 102 is located in one or more cell site network components 310 in signal communication (e.g., the one or more connection interfaces 312) with a terminal 320 (e.g., the base station 160*a*) and in signal communication (e.g., connection 314) with one or more of the components in the system architecture 200. As a non-limiting example, the cell site network components 310 may comprise one or more cell site peripherals 332 (e.g., the satellite dish 334), a routing controller 336, one or more DUs 338, one or more CUs 340, at least one primary power source 342, and at least one secondary power source 344. The at least one primary power source 342, and the at least one secondary power source 344 may be one of the power supplies 156 under the one or more power sources 154. The terminal 320 may comprise one or more terminal peripherals 350*a*-350*c* (collectively, terminal peripherals 350), one or more communication paths 352*a*-352*c* (collectively, communication paths 352), and one or more RUs 354*a*-354*c* (collectively, RUs 354).

The cell site peripherals 332 may be configured to perform one or more of the operations described in reference to the server I/O interfaces 124, the BS network interface 182, and/or the UE network interface 170. The routing controller 336 may be configured to perform one or more transmission operations, data exchange operations, and/or one or more routing operations in the communication system 100. The routing controller 336 may be configured to establish the communication sessions as described in reference to FIG. 1.

In some embodiments, the terminal 320 (e.g., the base station 160*a*, the cell site, or gNB) is mainly split into three parts namely the RUs 354, the DUs 338, and the CUs 340. The RUs 354 are radio hardware entities that convert radio signals sent to and from antennas into digital signals for transmission over a packet network. The RUs 354 handle a digital front end (DFE) and a lower physical (PHY) layer. The DUs 338 may be hardware and software executed by hardware that is deployed on site in communication with the server 102 and/or the non-real time RIC 204. The DUs 328 may be deployed close to the RUs 354 on the cell site and provides support for the lower layers of the protocol stack such as the radio link control (RLC), medium access control (MAC), and parts of the PHY layer. The CUs 340 may be hardware and software executed by hardware configured to provide support for the higher layers of the protocol stack such as the service data adaptation protocol (SDAP), packet data convergence protocol (PDCP), and radio resource control (RRC). In one or more embodiments, the server 102 and/or the non-real time RIC 204 may be configured to perform regular health checks at the cell site to check performance of the DUs 338 and RUs 354 associated with the cell site.

In one or more embodiments, the server 102 and/or the non-real time RIC 204 may be configured to modify communication operations 300 comprising the RUs 354. In particular, the server 102 and/or the non-real time RIC 204 may be configured to reduce, increase, or maintain a number of active RUs 354 at any given time. For example, in conjunction with establishing communication session between the first network component 118*a* and the second network component 118*b* based at least in part upon the plurality of configuration commands 136, the server 102 and/or the non-real time RIC 204 may be configured to perform one or more DU operations by the DUs 338. The server 102 and/or the non-real time RIC 204 may be configured to perform the one or more DU operations by the DUs 338 and one or more CU operations by the CUs 340. In one or more embodiments, one or more network components 118 in the RAN 112 may be configured to transform from perform DU functions and/or operations to performing a combination of DU and CU functions and/or operations.

The primary power source 342 and/or the secondary power source 344 may be hardware configured to supply power to the cell site network components 310 and the terminal 320. The primary power source 342 may be configured to be a primary power assistance to the cell site network components 310 or the terminal 320. The primary power source 342 and/or the secondary power source 344 may be configured to provide power directly from a grid (e.g., a microgrid, a local grid, or a regional grid). The primary power source 342 and/or the secondary power source 344 may be configured to receive, regulate, modulate, and/or control power to the cell site network components 310 and the terminal 320. The primary power source 342 and/or the secondary power source 344 may be configured to operate as a backup power source such as a generator transforming energy of a first type to energy (e.g., gas) of a second type of energy (e.g., electrical). In some embodiments, the server 102 and/or the non-real time RIC 204 is configured to determine whether communication sessions between the first network component 118*a* and the second network component 118*b* are interrupted based at least in part upon a loss of connectivity with the primary power source 342. In response to determining that the communication session is interrupted based at least in part upon the loss of connectivity with the primary power source 342, the server 102 and/or the non-real time RIC 204 may be configured to transition power consumption from the primary power source 342 to the secondary power source 342.

In the example of FIG. 3, the terminal peripherals 350 comprise a terminal peripheral 350*a*, a terminal peripheral 350*b*, and a terminal peripheral 350*c*. In some embodiments, the terminal peripherals 350 may comprise less or more terminal peripherals 350 than those shown in FIG. 3. Further, the terminal peripherals may be MIMO antennas configured to be one or more sectors configured to communicate with a massive number of components or devices. The terminal peripherals 350*a*-350*c* may be an alpha sector, a beta sector, and a gamma sector, respectively. In one or more embodiments, the terminal 320 may comprise less or more sectors than those shown in FIG. 3.

In some embodiments, the server 102 and/or the non-real time RIC 204 may be configured to reduce, increase, or maintain a number of terminal peripherals 350 available for the communication operations 300 at any given time. Further, the server 102 and/or the non-real time RIC 204 may be configured to move communication sessions from a first terminal peripheral 350*a* to a second terminal peripheral 350*b*. In other embodiments, the server 102 and/or the non-real time RIC 204 may be configured to reduce, increase, or maintain a number of communication paths 352 available for the communication operations 300 at any given time. For example, as part of modifying cell site resources, the server 102 and/or the non-real time RIC 204 may be configured to transition a number of communication paths 352*a* from four available communication paths 352*a* to two available communication paths 352*a*.

In FIG. 3, the communication paths 352 comprise communication paths 352*a* in association with the terminal peripheral 350*a*, communication paths 352*b* in association with the terminal peripheral 350*b*, and communication paths 352*c* in association with the terminal peripheral 350*c*.

The connection interfaces 312 may be one or more interfaces configured to exchange data and/or controls between the RUs 354 and the cell site network components 310. The connection interfaces 312 may be one or more cables configured to distribute power between the RUs 354 and the cell site network components 310. The connection interfaces 312 may be configured to follow an evolved common public radio interface (eCPRI) protocol. The eCPRI protocol may be configure the connection interfaces 312 as fronthaul transport network eCPRI interfaces corresponding to each of the RUs 354 and/or the corresponding terminal peripherals 350. The connection 314 may be a wireless communication link between the cell site network components 310.

In some embodiments, the non-real time RIC 204 may be configured to determine power loss using data from RUs 354 and amplifiers on site. As the power loss may not a fast-changing data point, the non-real time RIC 204 may be configured to calculate the power loss and coordinate between the amplifiers and the RUs 354 to ensure the RUs 354 are receiving enough power. The non-real time RIC 204 may monitor the connection interfaces 312 for corrosion if the connection interfaces 312 comprise cables experiencing higher power loss over time and instruct the amplifier to compensate or notify personnel if repairs are necessary. As the non-real time RIC 204 may not be located at any one communication site, the non-real time RIC 204 may monitor large numbers of terminals 320, RUs 354, and the like. The non-real time RIC 204 may be centralized monitoring that allows for additional intelligence to be implemented rather than having each communication site monitoring power loss and power consumption on each line.

In one or more embodiments, the server 102 and/or the non-real time RIC 204 may be configured to determine one or more unexpected power loss events at a communication site. The server 102 may be configured to determine power consumption at one or more network components (e.g., one or more RUs 354), one or more power supplies 156, and any connection interfaces 312 (e.g., cables) connecting the network elements to the power supplies 156. Herein, the server 102 may be configured to determine a power loss at each connection interface 312 connecting each RU 354 and at least one corresponding power supply 156. In one or more embodiments, the power saving operations 104 may be configured to determine whether power loss and/or consumed at the RUs 354 and/or the connection interfaces 312 is within a threshold range comprising a higher threshold and a lower threshold. The threshold range may be determined based on information associated with the connection interfaces 312. For example, the threshold range may be determined based on a gauge of cables and/or power rating associated with power transmissions between the power sources 154 and the RUs 354. The threshold ranges may be determined dynamically over time. The threshold ranges may be predefined and/or predetermined in accordance with information in datasheets associated with one or more of the connection interfaces 312. In some embodiments, the server 102 may be configured to calculate the threshold range based on datapoints associated with the connection interfaces 312 and/or power transmitted from one of the power supplies 156. For example, the threshold range may be calculated (in Watts (W)) based at least in part upon a current (in Amperes (A)) travelling in the connection interfaces 312, a resistance (in Ohms (Ω)) associated with the connection interfaces 312, and/or a voltage drop (in Volts (V)) across the connection interfaces 312. In turn, the resistance associated with the connection interfaces 312 may be obtained from the datasheets and/or specification information (e.g., gauge) associated with the connection interfaces 312. As described above, the non-real time RIC 204 may be configured to perform some, or all of the operations performed by the server 102.

In one or more embodiments, the server 102 may be configured to determine a durability of the connection interfaces 312 over time, decay associated with the connection interfaces 312, and/or unexpected power changes in the connection interfaces 312 over time.

Example Process to Determine and Coordinate Power Loss

FIG. 4 illustrates an example flowchart of the process 400 to determine and coordinate power loss in the communication system 100, in accordance with one or more embodiments. Modifications, additions, or omissions may be made to the process 400. The process 400 may include more, fewer, or other operations than those shown above. For example, operations may be performed in parallel or in any suitable order. While at times discussed as the server 102, one or more of the network components 118, one or more of the base stations 160, the non-real time RIC 204, components of any of thereof, or any suitable system or components of the security system 100 may perform one or more operations of the process 400. For example, one or more operations of the process 400 may be implemented, at least in part, in the form of server instructions 132 of FIG. 1, stored on non-transitory, tangible, machine-readable media (e.g., server memory 130 of FIG. 1 operating as a non-transitory computer readable medium) that when run by one or more processors (e.g., the server processor 122 of FIG. 1) may cause the one or more processors to perform operations described in operations 402-432.

In one or more embodiments, the server 102 and/or the non-real time RIC 204 may be configured to determine power loss using data from an RU 354 and a power supply 156 at a given communication site. Herein, the server 102 and/or the non-real time RIC 204 may be configured to determine power loss at the connection interfaces 312 (e.g., cables) connecting the RUs 354 and the power supplies 156. The server 102 and/or the non-real time RIC 204 may calculate power at the connection interfaces 312 at any given time based on power information provided by each RU 354 and the power supplies 156. As a result, power between the power supplies 156 and each RU 354 may be known at any time. The server 102 and/or the non-real time RIC 204 may be used to 1) determine power loss caused by the connection interfaces 312 2) provide an additional layer to control power consumption at the RUs 354 to a) regulate high voltage drop thresholds (e.g., higher thresholds in a threshold range) and b) regulate low voltage drop thresholds (e.g., lower thresholds in a threshold range); 3) determine decay of connection interfaces 312 over time; 4) mitigate power loss caused by defective connection interfaces 312 by instructing the power supply 156 to compensate for loss power; and 5) determine whether contractor installed connection interfaces 312 in accordance with predefined specifications by tracking power changes at each connection interface 312 over time. In regard to (5), knowing the specification sheets of connection interfaces 312 to be installed by a contractor, the server 102 and/or the non-real time RIC 204 may determine an expected power loss at the connection interfaces 312. If an actual power loss at the cable does not match the expected power loss at the connection interfaces 312, the server 102 and/or the non-real time RIC 204 may be configured to determine that replacement of the connection interfaces 312 was not performed in accordance with the predefined specifications.

The process 400 starts at operation 402, where the server 102 obtains a first power value associated with a local power source 154 (e.g., one of the power sources 154, the primary power source 342, and/or the secondary power source 344) configured to provide power to a network component in a communication site. The local power source 154 may be coupled to the network component via one or more connection interfaces 312. The network component may be an RU 354. The connection interfaces 312 may be one or more power transmission cables coupling the local power source to the RU 354. At operation 404, the server 102 is configured to obtain a second power value associated with the network component. At operation 406, the server 102 is configured to determine a power loss value associated with the connection interfaces 312 coupling the power source 154 and the network component based on the first power value and the second power value. The power loss value may be representative of power lost during power distribution from the local power source to the network component.

The process 400 continues at operation 410, where the server 102 may determine whether the power loss value is within a predefined value range (e.g., a threshold range). In this regard, the server 102 may determine whether determining whether the power loss value is within a predefined value range and/or threshold range. In response, if the server 102 determines that the power loss value is within a predefined value range (i.e., YES), the process 400 proceeds to operation 422. In this case, at operation 422, the server 102 is configured to generate possible modifications 144 to one or more configuration commands 136. If the server 102 determines that the power loss value is not within a predefined value range (i.e., NO), the process 400 proceeds to operation 432. In this case, the process 400 may conclude at operation 432, where the server 102 is configured to generate a report indicating that the power loss value is not within the predetermined value range.

In this case, the process 400 may conclude at operations 424 and 426. At operation 424, the server 102 is configured generate a report comprising the power loss value and the possible modifications 144. At operation 426, the server 102 may be configured to associate the report with the communication site. The server 102 may be configured to associate the report with the communication site in one or more indexed lists, one or more of local and/or external databases, and/or in training information to prepare the machine learning algorithm 140. In some embodiments, the server 102 may be configured to transmit the report to the communication site. The server 102 may be configured to implement the one or more possible modifications 144 without transmitting the report to the communication site.

In one or more embodiments, in response to determining that the power loss value is below a lower threshold of the predefined value range during a predefined time period, the server 102 may be configured to determine that the network component is not receiving an expected power amount. The server 102 may be configured to generate possible modifications 144 to one or more configuration commands 136 comprising reducing the lower threshold of the predefined value range to match the power loss value. The server 102 may be configured to generate a report comprising the power loss value and the possible modifications 144 and associate the report with the communication site.

In some embodiments, in response to determining that the power loss value is above the higher threshold of the predefined value range during a predefined time period, the server 102 is configured to determine that the network component is not receiving an expected power amount. The server 102 may be configured to generate possible modifications 144 to a one or more configuration commands 136 comprising increasing the higher threshold of the predefined value range to match the power loss value. The server 102 may be configured to generate a report comprising the power loss value and the possible modifications 144 and associate the report with the communication site.

In other embodiments, in response to determining that power loss value is outside the expected power loss range, the server 102 is configured to determine that the network component is not receiving an expected power amount. The server 102 may be configured to generate a report comprising the power loss value and associate the report with the communication site. The expected power loss range may be a threshold range obtained from a datasheet associated with the connection interfaces 312. The expected power loss range may be a threshold range that is calculated based at least in part upon information obtained from a datasheet associated with the connection interfaces 312.

Example Process to Dynamically Allocate Power Consumption

FIG. 5 illustrate an example flowchart of the process 500 to dynamically allocate power consumption in the communication system 100, in accordance with one or more embodiments. Modifications, additions, or omissions may be made to the process 500. The process 500 may include more, fewer, or other operations than those shown above. For example, operations may be performed in parallel or in any suitable order. While at times discussed as the server 102, one or more of the network components 118, one or more of the base stations 160, the non-real time RIC 204, components of any of thereof, or any suitable system or components of the security system 100 may perform one or more operations of the process 400. For example, one or more operations of the process 400 may be implemented, at least in part, in the form of server instructions 132 of FIG. 1, stored on non-transitory, tangible, machine-readable media (e.g., server memory 130 of FIG. 1 operating as a non-transitory computer readable medium) that when run by one or more processors (e.g., the server processor 122 of FIG. 1) may cause the one or more processors to perform operations described in operations 502-542.

In one or more embodiments, the server 102 and/or the non-real time RIC 204 may be configured to determine power consumption at a communication site using current power consumption information, historical power consumption data (e.g., the historical data 150), and dynamic information of a given communication site. The server 102 and/or the non-real time RIC 204 may be configured to determine power consumption at the connection interfaces 312 connecting the RUs 354 and the power supplies 156. Here, the server 102 and/or the non-real time RIC 204 may be configured to calculate power delivery efficiency between the power supplies 156 and the RUs 354. This information may be dynamically coupled with additional factors such as location information 159*a*, weather information 159*b*, time (of day) information 159*c*, maintenance information of a given site, geolocation of the site, communication information 159*d* and the like. Over time, this information (e.g., one or more of the tracked indicators 158) may be used to generate historical data 150 of power delivery efficiency at the communication site. In this regard, the server 102 and/or the non-real time RIC 204 may be configured to identify power consumption indicators 158 that, when modify, affect the power consumption at the given communication site. The server 102 and/or the non-real time RIC 204 may be configured to determine power consumption behavior information of a communication site. This information may be used to inform constructions of sites comprising similar indicators 158. For example, power consumption at a site in a specific place (e.g., city, location, and state) may inform specifications to improve power consumption of sites in places with similar climate. Further, the server 102 and/or the non-real time RIC 204 may be configured to determine an ideal time to alternate power consumption between a utility company (e.g., alternating current (AC) power from a power grid) and an on-site battery (e.g., comprising direct current (DC)). In this regard, the server 102 and/or the non-real time RIC 204 may switch power between two power supplies from the power grid to the on-site battery to reduce AC power utilization during peak-load times. In some embodiments, the indicators 158 may enable the server 102 and/or the non-real time RIC 204 to dynamically switch power consumption from a primary power source 342 and a secondary power source 344. For example, the server 102 and/or the non-real time RIC 204 may be configured to determine that power may be supplied at a specific site by the battery every day of the week during peak-load hours. In this example, the server 102 and/or the non-real time RIC 204 may dynamically change settings if unusual higher loads are likely to happen at non-peak hours due to a weather event (incoming storm likely to cause communications to be diverted to the specific site), special event (sport game to cause more devices to be connected to the site), and the like.]

The process 500 starts at operation 502, where the server 102 obtain a first power value associated with a local power source 154 configured to provide the first power value to a network component in a communication site. The local power source 154 may be coupled to the network component via one or more connection interfaces 312. The local power source 154 may be configured to supply power from a first power supply 156*a* to the network component. At operation 504, the server 102 is configured to obtain a second power value associated with the network component. At operation 506, the server 102 is configured to determine a power consumption associated with the connection interfaces 312 based on the first power value and the second power value. The server 102 may be configured to determine a power consumption associated with the connection interfaces 312 based on the first power value and the second power value. The power consumption may be representative of power consumed during power distribution from the local power source 154 to the network component. At operation 508, the server 102 is configured to track the power consumption over a period of time. The server 102 may be configured to track the power consumption over a period of time. At operation 510, the server 102 is configured to determine one or more indicators 158 associated with the power consumption. The indicators 158 may be configured to represent one or more configuration commands 136 associated with the communication site.

The process 500 continues at operation 520, where the server 102 may determine whether the indicators 158 at least partially match a portion of historical data 150. In this regard, the server 102 may determine whether the tracked indicators 158 at least partially match a first portion of the historical data 150. In response, if the server 102 determines that the indicators 158 at least partially match the portion of historical data 150 (i.e., YES), the process 500 proceeds to operation 522. In this case, the process 500 may conclude at operation 522, the server 102 is configured to replace the first power supply 156*a* with a second power supply 156*b*. For example, the server 102 may be configured to transition from an on-site battery to a power grid. If the server 102 determines that the indicators 158 do not at least partially match a portion of historical data 150 (i.e., NO), the process 500 proceeds to operation 532. In this case, the process 500 may conclude at operation 532, where the server 102 is configured to generate a report indicating that the power loss value is not within the predetermined value range. The first power supply 156*a* may be associated with the primary power source 342 and the second power supply 156*b* may be associated with the secondary power source 344.

In one or more embodiments, the first power supply 156*a* is a local battery located at the communication site and the second power supply 156*b* may be one or more connection elements to a power grid. In some embodiments, the first power supply 156*a* may be one or more connection elements to a power grid and the second power supply 156*b* may be a local battery located at the communication site. The indicators 158 may comprise weather information 159*b* associated with possible changes in weather over the period of time in one or more areas surrounding the communication site. For example, the indicators 158 may represent changes in climate and/or weather. The indicators 158 may comprise location information 159*a* associated with possible topographical changes over the period of time in one or more areas surrounding the communication site. For example, the indicators 158 may represent changes to structures at the communication site and any surrounding areas. The indicators 158 may comprise event information associated with possible changes in a number of access points over the period of time in one or more areas surrounding the communication site. For example, the indicators 158 may represent changes on loads associated with a specific communication site. These changes may comprise accounting for access points (e.g., users) in a predefined area. For example, the changes may account for several users arriving to a sport venue.

Scope of the Disclosure

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus, comprising:

a memory configured to store:

one or more configuration commands, each configuration command associated with one or more power consumption guidelines; and a processor communicatively coupled to the memory and configured to:

obtain a first power value associated with a local power source configured to provide a first power transmission to a first network component in a first communication site, the local power source being coupled to the first network component via a first plurality of connection interfaces;

obtain a second power value associated with the first network component;

determine a first power loss value associated with the first plurality of connection interfaces based on the first power value and the second power value, the first power loss value being representative of power lost during power distribution from the local power source to the first network component;

determine whether the first power loss value is within a first predefined value range;

in response to determining that the first power loss value is within the first predefined value range, generate first possible modifications to a first plurality of configuration commands;

generate a first report comprising the first power loss value and the first possible modifications; and associate the first report with the first communication site.

2. The apparatus of claim 1, wherein the processor is further configured to:

obtain a third power value associated with the local power source configured to provide a second power transmission to a second network component in a second communication site, the local power source being coupled to the second network component via a second plurality of connection interfaces;

obtain a fourth power value associated with the second network component;

determine a second power loss value associated with the second plurality of connection interfaces based on the third power value and the fourth power value, the second power loss value being representative of power lost during power distribution from the local power source to the second network component;

determine whether the second power loss value is below a lower threshold of a second predefined value range during a predefined time period;

in response to determining that the second power loss value is below the lower threshold of the second predefined value range during the predefined time period, determine that the second network component is not receiving an expected power amount;

generate second possible modifications to a second plurality of configuration commands comprising reducing the lower threshold of the second predefined value range to match the second power loss value;

generate a second report comprising the second power loss value and the second possible modifications; and associate the second report with the second communication site.

3. The apparatus of claim 1, wherein the processor is further configured to:

obtain a third power value associated with the local power source configured to provide a second power transmission to a second network component in a second communication site, the local power source being coupled to the second network component via a second plurality of connection interfaces;

obtain a fourth power value associated with the second network component;

determine a second power loss value associated with the second plurality of connection interfaces based on the third power value and the fourth power value, the second power loss value being representative of power lost during power distribution from the local power source to the second network component;

determine whether the second power loss value is above a higher threshold of a second predefined value range during a predefined time period;

in response to determining that the second power loss value is above the higher threshold of the second predefined value range during the predefined time period, determine that the second network component is not receiving an expected power amount;

generate second possible modifications to a second plurality of configuration commands comprising increasing the higher threshold of the second predefined value range to match the second power loss value;

generate a second report comprising the second power loss value and the second possible modifications; and associate the second report with the second communication site.

4. The apparatus of claim 1, wherein:

the first network component is a radio unit (RU); and the first plurality of connection interfaces are one or more power transmission cables coupling the local power source to the RU.

5. The apparatus of claim 1, wherein the processor is further configured to:

obtain a third power value associated with the local power source configured to provide a second power transmission to a second network component in a second communication site, the local power source being coupled to the second network component via a second plurality of connection interfaces;

obtain a fourth power value associated with the second network component;

determine a second power loss value associated with the second plurality of connection interfaces based on the third power value and the fourth power value, the second power loss value being representative of power lost during power distribution from the local power source to the second network component;

determine whether the second power loss value is within an expected power loss range;

in response to determining that the second power loss value is outside the expected power loss range, determine that the second network component is not receiving an expected power amount;

generate a second report comprising the second power loss value; and associate the second report with the second communication site.

6. The apparatus of claim 5, wherein the expected power loss range is obtained from a datasheet associated with the second plurality of connection interfaces.

7. The apparatus of claim 5, wherein the expected power loss range is calculated based at least in part upon information obtained from a datasheet associated with the second plurality of connection interfaces.

8. A method, comprising:

obtaining a first power value associated with a local power source configured to provide a first power transmission to a first network component in a first communication site, the local power source being coupled to the first network component via a first plurality of connection interfaces;

obtaining a second power value associated with the first network component;

determining a first power loss value associated with the first plurality of connection interfaces based on the first power value and the second power value, the first power loss value being representative of power lost during power distribution from the local power source to the first network component;

determining whether the first power loss value is within a first predefined value range;

in response to determining that the first power loss value is within the first predefined value range, generating first possible modifications to a first plurality of configuration commands;

generating a report comprising the first power loss value and the first possible modifications; and associating the report with the first communication site.

9. The method of claim 8, further comprising:

obtaining a third power value associated with the local power source configured to provide a second power transmission to a second network component in a second communication site, the local power source being coupled to the second network component via a second plurality of connection interfaces;

obtaining a fourth power value associated with the second network component;

determining a second power loss value associated with the second plurality of connection interfaces based on the third power value and the fourth power value, the second power loss value being representative of power lost during power distribution from the local power source to the second network component;

determining whether the second power loss value is below a lower threshold of a second predefined value range during a predefined time period;

in response to determining that the second power loss value is below the lower threshold of the second predefined value range during the predefined time period, determining that the second network component is not receiving an expected power amount;

generating second possible modifications to a second plurality of configuration commands comprising reducing the lower threshold of the second predefined value range to match the second power loss value;

generating a second report comprising the second power loss value and the second possible modifications; and associating the second report with the second communication site.

10. The method of claim 8, further comprising:

obtaining a third power value associated with the local power source configured to provide a second power transmission to a second network component in a second communication site, the local power source being coupled to the second network component via a second plurality of connection interfaces;

obtaining a fourth power value associated with the second network component;

determining a second power loss value associated with the second plurality of connection interfaces based on the third power value and the fourth power value, the second power loss value being representative of power lost during power distribution from the local power source to the second network component;

determining whether the second power loss value is above a higher threshold of a second predefined value range during a predefined time period;

in response to determining that the second power loss value is above the higher threshold of the second predefined value range during the predefined time period, determining that the second network component is not receiving an expected power amount;

generating second possible modifications to a second plurality of configuration commands comprising increasing the higher threshold of the second predefined value range to match the second power loss value;

generating a second report comprising the second power loss value and the second possible modifications; and associating the second report with the second communication site.

11. The method of claim 8, wherein:

the first network component is a radio unit (RU); and the first plurality of connection interfaces are one or more power transmission cables coupling the local power source to the RU.

12. The method of claim 8, further comprising:

obtaining a third power value associated with the local power source configured to provide a second power transmission to a second network component in a second communication site, the local power source being coupled to the second network component via a second plurality of connection interfaces;

obtaining a fourth power value associated with the second network component;

determining a second power loss value associated with the second plurality of connection interfaces based on the third power value and the fourth power value, the second power loss value being representative of power lost during power distribution from the local power source to the second network component;

determining whether the second power loss value is within an expected power loss range;

in response to determining that the second power loss value is outside the expected power loss range, determining that the second network component is not receiving an expected power amount;

generating a second report comprising the second power loss value; and associating the second report with the second communication site.

13. The method of claim 12, wherein the expected power loss range is obtained from a datasheet associated with the second plurality of connection interfaces.

14. The method of claim 12, wherein the expected power loss range is calculated based at least in part upon information obtained from a datasheet associated with the second plurality of connection interfaces.

15. A non-transitory computer-readable medium storing instructions that when executed by a processor cause the processor to:

obtain a first power value associated with a local power source configured to provide first power value to a first network component in a first communication site, the local power source being coupled to the first network component via a first plurality of connection interfaces;

obtain a second power value associated with the first network component;

determine a first power loss value associated with the first plurality of connection interfaces based on the first power value and the second power value, the first power loss value being representative of power lost during power distribution from the local power source to the first network component;

determine whether the first power loss value is within a first predefined value range;

in response to determining that the first power loss value is within the first predefined value range, generate first possible modifications to a first plurality of configuration commands;

generate a report comprising the first power loss value and the first possible modifications; and associate the report with the first communication site.

16. The non-transitory computer-readable medium of claim 15, wherein, when executed by the processor, the instructions further cause the processor to:

obtain a third power value associated with the local power source configured to provide a second power transmission to a second network component in a second communication site, the local power source being coupled to the second network component via a second plurality of connection interfaces;

obtain a fourth power value associated with the second network component;

determine a second power loss value associated with the second plurality of connection interfaces based on the third power value and the fourth power value, the second power loss value being representative of power lost during power distribution from the local power source to the second network component;

determine whether the second power loss value is below a lower threshold of a second predefined value range during a predefined time period;

in response to determining that the second power loss value is below the lower threshold of the second predefined value range during the predefined time period, determine that the second network component is not receiving an expected power amount;

generate second possible modifications to a second plurality of configuration commands comprising reducing the lower threshold of the second predefined value range to match the second power loss value;

generate a second report comprising the second power loss value and the second possible modifications; and associate the second report with the second communication site.

17. The non-transitory computer-readable medium of claim 15, wherein, when executed by the processor, the instructions further cause the processor to:

obtain a third power value associated with the local power source configured to provide a second power transmission to a second network component in a second communication site, the local power source being coupled to the second network component via a second plurality of connection interfaces;

obtain a fourth power value associated with the second network component;

determine a second power loss value associated with the second plurality of connection interfaces based on the third power value and the fourth power value, the second power loss value being representative of power lost during power distribution from the local power source to the second network component;

determine whether the second power loss value is above a higher threshold of a second predefined value range during a predefined time period;

in response to determining that the second power loss value is above the higher threshold of the second predefined value range during the predefined time period, determine that the second network component is not receiving an expected power amount;

generate second possible modifications to a second plurality of configuration commands comprising increasing the higher threshold of the second predefined value range to match the second power loss value;

generate a second report comprising the second power loss value and the second possible modifications; and associate the second report with the second communication site.

18. The non-transitory computer-readable medium of claim 15, wherein:

the first network component is a radio unit (RU); and the first plurality of connection interfaces are one or more power transmission cables coupling the local power source to the RU.

19. The non-transitory computer-readable medium of claim 15, wherein, when executed by the processor, the instructions further cause the processor to:

obtain a third power value associated with the local power source configured to provide a second power transmission to a second network component in a second communication site, the local power source being coupled to the second network component via a second plurality of connection interfaces;

obtain a fourth power value associated with the second network component;

determine a second power loss value associated with the second plurality of connection interfaces based on the third power value and the fourth power value, the second power loss value being representative of power lost during power distribution from the local power source to the second network component;

determine whether the second power loss value is within an expected power loss range;

in response to determining that the second power loss value is outside the expected power loss range, determine that the second network component is not receiving an expected power amount;

generate a second report comprising the second power loss value; and associate the second report with the second communication site.

20. The non-transitory computer-readable medium of claim 19, wherein the expected power loss range is obtained from a datasheet associated with the second plurality of connection interfaces.

* * * * *